United States Patent [19]

Ogura et al.

[11] Patent Number: 5,067,028
[45] Date of Patent: Nov. 19, 1991

[54] IMAGE PICKUP PRINTING DEVICE

[75] Inventors: Wataru Ogura, Suwa; Hiroshi Kamijima, Okaya, both of Japan

[73] Assignee: Chinon Kabushiki Kaisha, Nagano, Japan

[21] Appl. No.: 587,633

[22] Filed: Sep. 25, 1990

Related U.S. Application Data

[63] Continuation of Ser. No. 295,755, Jan. 11, 1989, abandoned.

[30] Foreign Application Priority Data

Jan. 25, 1988 [JP] Japan .................. 63-13796

[51] Int. Cl.$^5$ .............................................. H04N 1/04
[52] U.S. Cl. ..................................... 358/494; 358/400; 358/474; 358/497; 358/213.13
[58] Field of Search .............. 358/401, 471, 474, 479, 358/494, 497, 102, 213.11, 312.13

[56] References Cited

U.S. PATENT DOCUMENTS

| 4,694,354 | 9/1987 | Tanaka et al. | 358/102 |
| 4,755,880 | 7/1988 | Haenel et al. | 358/494 |
| 4,755,882 | 7/1988 | Toyota | 358/401 |
| 4,860,108 | 8/1989 | Saito et al. | 358/213.13 |
| 4,942,477 | 7/1990 | Nakamura | 358/401 |

Primary Examiner—Joseph A. Orsino
Assistant Examiner—Thomas D. Lee
Attorney, Agent, or Firm—Parkhurst, Wendel & Rossi

[57] ABSTRACT

An image pickup printing device wherein images such as characters or diagrams written on a board or the like are made incident through a lens, the incidental images are monitored by a view-finder, the thus-monitored images are converted into the information by a one-dimensional image sensor, and the images are printed out by a printer based on informations obtained by the one-dimensional image sensor.

1 Claim, 1 Drawing Sheet

FIG. 2

IMAGE PICKUP PRINTING DEVICE

This is a continuation of application Ser. No. 07/295,755 filed Jan. 11, 1989, now abandoned.

BACKGROUND OF THE INVENTION

1. Field of the Invention:

The present invention relates to an image pickup printing device for printing characters or diagrams written on a blackboard or a wall in a street onto paper.

2. Description of the Prior Art:

A so-called electronic-blackboard is known which is able to print onto a paper characters or diagrams written on a blackboard (in the form of a whiteboard) provided with a scanning function by using a thermal printer integrated thereto in accordance with the thus-scanned information. Another device is known which is capable of printing a copy of an original disposed at a predetermined position after reading it with a scanner thereof.

Hitherto, there have been a device which is capable of printing out the characters or diagrams written on special blackboard having a scanning function and another device capable of printing out a copy of an original disposed at a predetermined position. However, the devices of the type described above cannot acquire as information, that is, cannot print out, characters or diagrams written on an ordinary blackboard, outside wall, board or the like, and as well as a spatial sketch.

SUMMARY OF THE INVENTION

An object of the present invention is to provide an image pickup printing device capable of, in a meeting room or the like, instantaneously printing out characters or diagrams written on a board or characters or diagrams projected by an overhead projector.

An image pickup printing device according to the present invention comprises an image pickup image scanner which includes a one-dimensional image sensor for converting incident images from a lens into information. Furthermore, the image pickup printing device according to the present invention includes a viewfinder for monitoring the images and a printer for printing such images based on informations obtained by the one-dimensioned image sensor.

The image scanner comprises a focusing plate for focusing an incident image from a lens and a line image sensor arranged to be slid together with this focusing plate for the purpose of scanning the image focused on the focusing plate.

According to the present invention, the lens is directed toward the board or the like, images such as characters or diagrams written on the board or the like are made incident through the lens, the incidental images are monitored by the view-finder, and the thus-monitored images are converted into information by the one-dimensional image sensor. Then, the images are printed out by a printer based on informations obtained by the one-dimensional image sensor.

Other objects and characteristics of the present invention will be described with reference to the following drawings.

DESCRIPTION OF PREFERRED EMBODIMENTS

An embodiment of the present invention will be described with reference to the drawings.

Figure 1:
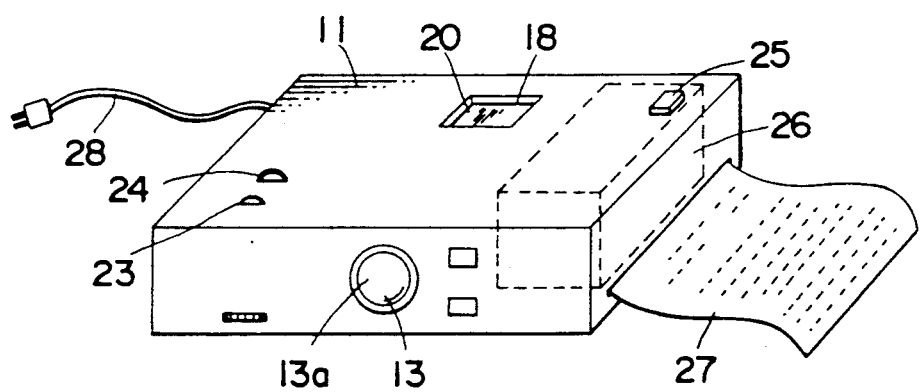
FIG. 1 is a perspective view illustrating an image pickup printing device according to an embodiment of the present invention.
Figure 2:
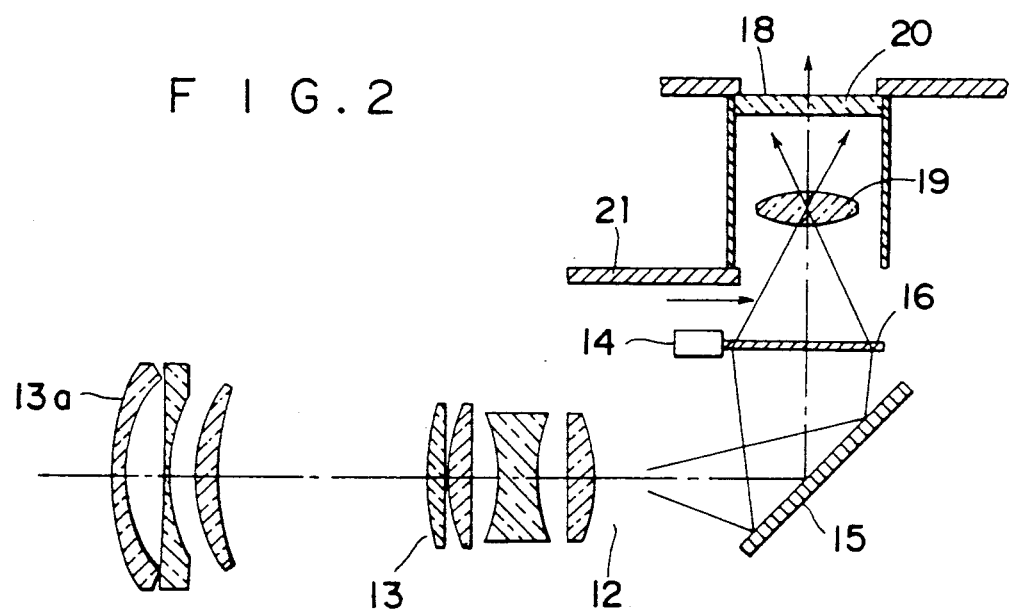
FIG. 2 is a structural view of an image scanner for use in the device shown in FIG. 1.

Referring to FIG. 1, reference numeral 11 represents a main body case, this main body case 11 including an image scanner 12 for scanning images. The main structure of this image scanner 12 comprises an objective lens 13 such as a zoom lens and a one-dimensional image sensor or a line image sensor 14. A forelens 13a of the objective lens 13 is, as shown in FIG. 1, disposed on one side surface of the main body case 11. A reflection mirror 15 is disposed behind (on the right in FIG. 2) the objective lens 13, and a focusing plate 16 such as frosted glass is provided to be slidable to the right in the drawing. The line image sensor 14 slides together with this focusing plate 16 when this focusing plate 16 slides to the right in the drawing so that the image to be focused on the focusing plate 16 is scanned and is converted into information, this line image sensor 14 being secured on one side portion of the focusing plate 16. This focusing plate 16 is driven in the sliding direction by a motor or the like (omitted from illustration), and the line image sensor 14 slides in the same direction as that of slide of the focusing plate 16 when this focusing plate 16 slides. That is, the line image sensor 14 slides to the right in the drawing as the sub-scanning operation thereof and continues main scanning operation in the direction perpendicular to the sub-scanning direction during this sub-scanning operation. As a result, the image to be focused on the focusing plate 16 is scanned.

A view finder 18 is provided above the focusing plate 16. This view-finder 18 consists of a lens for enlarging the image on the focusing plate 16 and a transparent plate 20 disposed within an opening disposed in the upper surface of the main body case 11.

Reference numeral 21 represents a shutter plate disposed between the focusing plate 16 and an enlarging lens 19 in such a manner that it can slide to the right in this drawing. This shutter plate 21 shuts light from outside to the focusing plate 16 when the line image sensor 14 performs the scanning operation. The sliding operation by this shutter plate 21 is performed prior to the sliding operation performed by the focusing plate 16. This shutter plate is driven via a cam mechanism (omitted from illustration) by the above-described motor.

Referring back to FIG. 1, reference numeral 23 represents a zoom-ratio adjusting dial, and reference numeral 24 represents a focus adjusting dial disposed on the upper surface of the main body case 11 for the purpose of adjusting a focus ratio or a focus in conjunction with the objective lens 13.

Reference numeral 25 represents a copy button disposed on the upper surface of the main body case 11. When this copy button 25 is depressed, a printer 26 of a line heat-sensitive type included in the main body case 11 is operated so that a printed paper 27 is printed out. Reference numeral 28 represents a power source cord.

Figure 3:
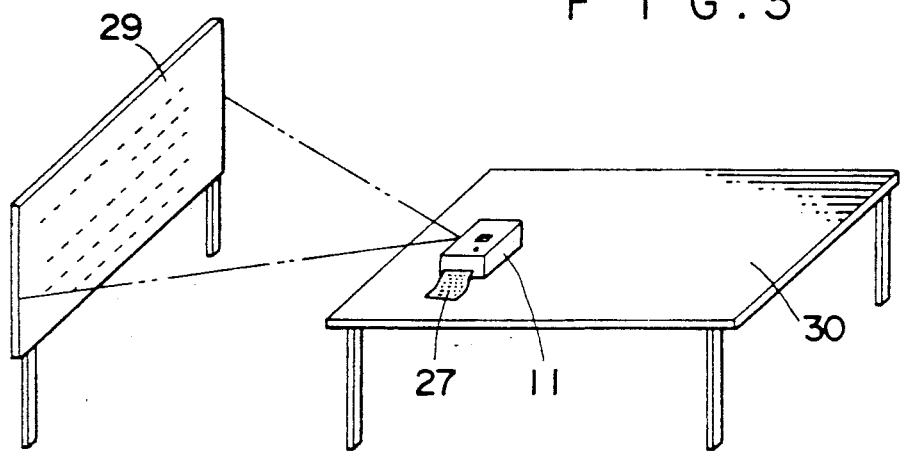
FIG. 3 is a perspective view illustrating a state where the device shown in FIG. 1 is used.

The image pickup printing device structured as described above is, as shown in FIG. 3, disposed on a desk 30 in such a manner that objective lens 13 thereof faces a board 29 in a conference room or the like.

As a result, images such as characters or diagrams written on the board 29 are, through the lens, made incident, and then the incident images are focused on the focusing plate 16 via the reflection mirror 15. The user adjusts the zoom ratio or the focus of the objective lens 13 by operating the dials 23 and 24 while monitoring the images through the view-finder 18. Next, when the copy button 25 is depressed, the motor is operated so that the shutter plate 21 is first slid by the cam mechanism to the right in FIG. 2 so that outside light advancing through the transparent plate 20 is shut. Then, the focusing plate 16 and the line image sensor 14 secured to this focusing plate 16 are slid to the right in the drawing.

The line image sensor 14 continues its main scanning operating during the sub-scanning operation by the sliding operation so that the images to be focused on the focusing plate 16 are scanned. As a result, when the line image sensor 14 has moved from left to the right end position above the reflection mirror 15 shown in FIG. 2, the scanning operation is completed, and thereby, the line image sensor 14 is returned to the left end position again. Next, the shutter plate 21 is also returned to the position shown in FIG. 2. The distance subjected to the sub-scanning operation performed by the line image sensor 14 is arranged to be, for example, substantially 28 mm, while its scanning time period is substantially 20 seconds.

Information of the characters or the diagrams generated by the line image sensor 14 during the above-described scanning operation is, by a CPU or a logic circuit (omitted from illustration), binarized during this scanning operation. The thus-binarized information is output to the line thermal printer 26. This printer 26 prints out the characters or diagrams to paper 27 based on this information. As such a printer 26, conventional printers including a printing head or paper supply mechanism may be used.

In this way, characters or diagrams on the board 29 can be reproduced on the paper 27.

Since the line image sensor 14 is slid together with the focusing plate 16 and the focusing surface is moved at the time of performing the scanning by the above-described line image sensor 14, the optical system can be simplified, reducing the manufacturing cost.

In a case where a zoom lens is not used as the objective lens 13, A4 or letter size paper printing can be performed by designating the printing-out area by the view-finder 18 and by electrically changing the magnification, and therefore a lower cost device can be obtained.

As described above, according to the present invention, characters or diagrams written on a board or the like disposed in a conference room or the like can be scanned and printed out at a location away from the board. As a result of this, the device according to the present invention can be also applied to the case in which characters or diagrams written on a wall in the street or images projected by an overhead projector or the like are to be reproduced on a paper.

What is claimed is:

1. An image pickup printing device comprising:
   an objective lens;
   an optical view-finder for monitoring an image through said objective lens, said optical view-finder including a reflection mirror for reflecting said image, a focusing plate for focusing said reflected image, and enlarging means for enlarging said focused image;
   a line image sensor arranged to slide with said focusing plate, for scanning said focused image;
   a line printer for printing an image obtained by said line image sensor; and
   shutter means, comprising a shutter which is slidably movable into a position between said view-finder and said focusing plate, for preventing light from reaching said line image sensor via said view-finder, said shutter means further comprising driving means for automatically positioning said shutter into said position between said view-finder and said focusing plate upon starting said printing;
   wherein said view-finder and said focusing plate are disposed along a common optical path.

* * * * *